June 18, 1968   E. FUHRMANN ET AL   3,389,034
EXTRUSION PROCESS FOR THE PRODUCTION OF ARTICLES
OF ELASTIC SUBSTANCES
Filed July 16, 1964
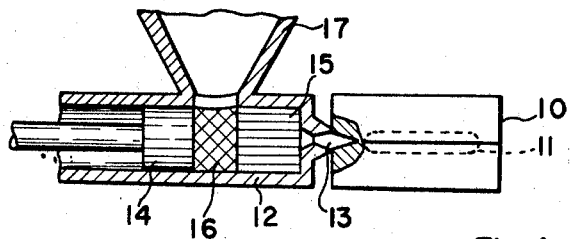
Fig. 1
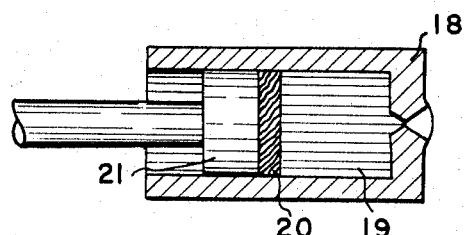
Fig. 2
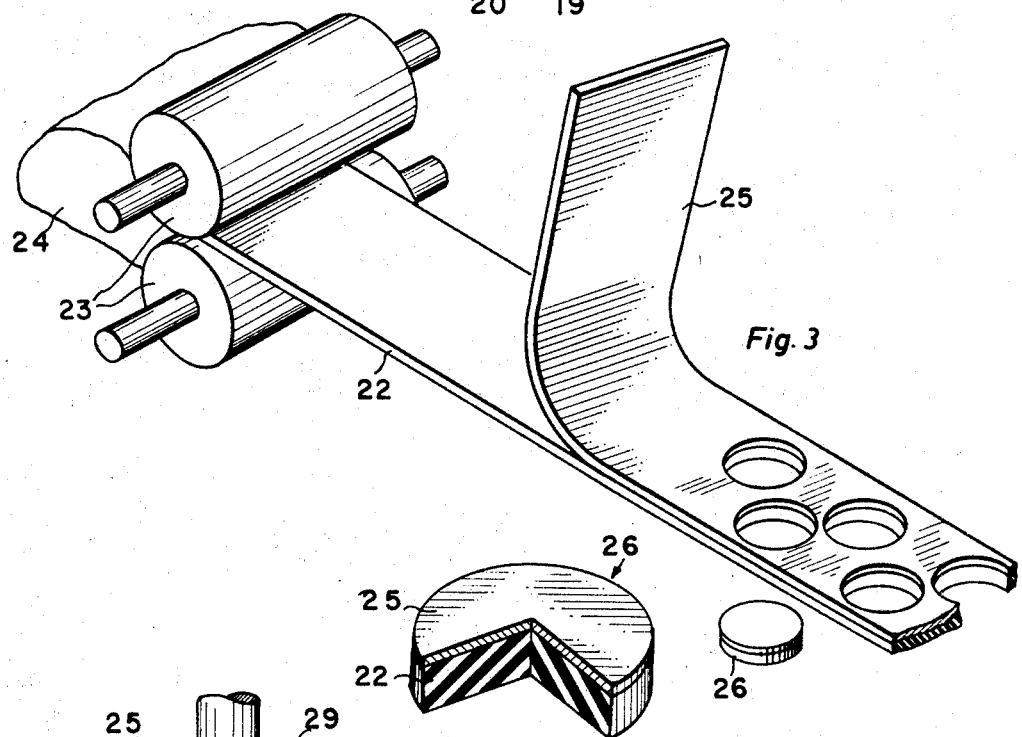
Fig. 3
Fig. 4
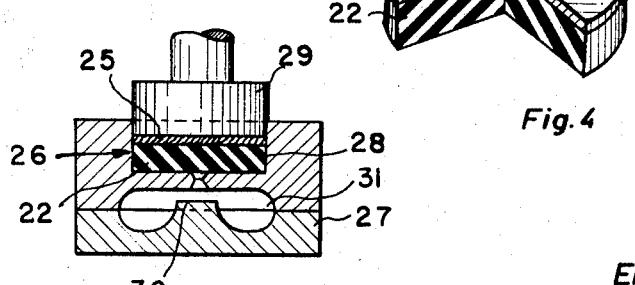
Fig. 5
Inventor
Ernst FUHRMANN
Horst HERMANN
By Trabman & Trabman
Atty

United States Patent Office 3,389,034
Patented June 18, 1968

3,389,034
EXTRUSION PROCESS FOR THE PRODUCTION OF ARTICLES OF ELASTIC SUBSTANCES
Ernst Fuhrmann, Burscheid, Bezirk Dusseldorf, and Horst Hermann, Opladen, Germany, assignors to Goetzewerke Friedrich Goetze A.-G., Burscheid, Bezirk Dusseldorf, Germany
Filed July 16, 1964, Ser. No. 383,127
4 Claims. (Cl. 156—242)

ABSTRACT OF THE DISCLOSURE

Molding process wherein molding material is displaced from a cylinder into a cavity by a plunger and particularly characterized in that the molding material is supplied to the cylinder in an amount only slightly greater than the volume of the mold cavity while an inexpensive bulk material is interposed between the plunger and the molding material thereby to reduce the residue of molding material remaining in the cylinder after a molding operation.

---

This invention relates to the molding of plastic materials, including rubber and synthetic rubber to transfer the materials into a molding cavity for forming workpieces.

The molding of materials by forcing a plastic mass of the material into a mold cavity is known, and the present invention is concerned with such known methods including a specific improvement with respect to reducing the expensive residue that sometimes remains after such a molding operation, and this means for isolating one mass of molding material from a subsequent mass of molding material can be handled in the same apparatus.

More specifically, the present invention is concerned with the use of a relatively inexpensive material for backing up a charge of molding material that is being forced into a mold cavity so that the minimum amount of the expensive molding material will be utilized to provide the necessary over-capacity to fill sprue passages and the like in the molding apparatus.

The present invention also proposes the provision of a material such as paper or the like backing up the molding charge to which the molding material will adhere so that the molding apparatus can easily be cleaned of any residue of the molding material after a molding operation.

The nature of the present invention will be more clearly understood upon reference to the following specification taken in connection with the accompanying drawings, in which:

FIGURE 1 is a schematic view of a molding process showing an injection cylinder in a mold;
FIGURE 2 is a view similar to FIGURE 1;
FIGURE 3 is a perspective view showing how a molding material could be combined with a backing up strip and then have pellets or slugs of material blanked therefrom for use in a molding process according to the present invention;
FIGURE 4 is a perspective sectional view showing one of the blanked out members before molding, and
FIGURE 5 is a sectional view showing how one of the blanked out members could be employed in a molding process.

Referring to the drawings somewhat more in detail, FIGURE 1 shows a separable mold 10 having a cavity 11 therein, and operatively associated with mold 10 is a molding apparatus consisting of a cylinder 12 connected with the mold cavity via a sprue passage 13. A piston 14 reciprocates in cylinder 12 and will displace in a cylinder molding material 15 which will flow via sprue passage 13 into cavity 11.

According to the present invention, a mass of material 16 is introduced between plunger 14 and material 15 so that following a molding operation, there will be a minimum amount of material 15 remaining in cylinder 12. Cavity 11 may be of such a size as to receive the entire charge of molding material in cylinder 12 or it may require several molding operations to exhaust the material in cylinder 15. In any case, when the molding operation is completed, it is desired for there to be a minimum amount of material 15 remaining as residue in cylinder 12. This is accomplished by introducing into the cylinder at the proper time the mass of material 16 which could be scrap material, paper or any other low cost material suitable for the purpose, and which itself can be easily removed from cylinder 12. Paper, for example, will tend to adhere to material 15 and any residue of material 15 will be withdrawn with the paper.

Where the molding is accomplished with a single advancing movement of piston 14, the introduction of material 16, whether it consists of a paper foil or some other material, will eliminate the necessity of extremely closely fitting the piston 14 into cylinder 12.

In FIGURE 1 the cylinder 12 is charged from a hopper 17 but, as will be seen in FIGURE 2, a cylinder 18 can be provided charged from the extreme rear end with molding material 19, and with there being a separating element 20, paper foil or other inexpensive material, introduced between material 19 and piston 21. By selecting the volume of material 19 carefully one or a plurality of molding operations could be carried out by the FIGURE 2 arrangement with a minimum amount of residue of material 19 remaining in cylinder 18.

It is proposed that the molding material can be calendered to form a strip thereof as indicated at 22 in FIGURE 3. In this figure the calendered rolls 23 from strip 22 form the mass of material 24. After the strip 22 is formed, it is joined with a paper foil or the like 25, and thereafter blanks 26 of the material are punched out from the laminated strip. These blanks are selected as to size by the thickness of strip 22, and the size of the punch which punches out the blanks so that each blank will exactly fill one mold cavity. The blanks are then pressed as indicated in FIGURE 5 wherein there is a mold 27 having cylinder means 28 formed in the upper portion thereof and a piston 29 reciprocates in the cylinder. A blank 26 is placed in cylinder 28 with the foil portion follower and then, upon driving piston 29 downwardly, the molding material is transferred through sprue opening 30 into mold cavity 31. The amount of molding material is selected so as to fill the mold cavity while leaving the minimum amount of material in cylinder 28. The material remaining in cylinder 28 adheres to the paper foil and can easily be stripped from the cylinder. As before, the provision of the backing up element, paper foil, for example, eliminates the need for fitting piston 29 extremely closely in cylinder 28.

It will be understood that in any of the foregoing molding operations, either the mold or the cylinder or both are preferably heated so that the molding material will flow freely. This also includes an operation wherein the cylinder is heated to the point that the material will flow readily therein while the mold is heated to the point that the material will cure therein.

The main idea in any case is the use of low cost material between the expensive molding material and the injection or molding piston or plunger. By utilizing a separating material of this nature, the necessity of closely fitting the piston to the cylinder is eliminated, and it has been found that the residue remaining in the cylinder of the expensive molding material can sometimes be reduced to an amount of only a fraction of a millimeter say, three-tenths of a millimeter or less. A substantial economy of molding material and an economy in the manufacture of the molding machines can thus be realized by the practice of the present invention.

It will be understood that this invention is susceptible to modification in order to adapt it to different usages and conditions; and accordingly, it is desired to comprehend such modifications within this invention as may fall within the scope of the appended claims.

What is claimed is:

1. In the molding of molding material in a mold cavity which has a cylinder in communication therewith and a plunger for forcing the molding material from the cylinder into the mold cavity, the method of reducing the residue of molding material remaining between the bottom of the cylinder and the end of the plunger after a molding operation which comprises: introducing the molding material in unconfined condition into the cylinder, placing a predetermined quantity of a frangible and relatively inexpensive separating material which is non-adhesive to the plunger between the molding material and the plunger, advancing the plunger into the cylinder and into engagement with the separating material and exerting pressure on the separating material to force the molding material from the cylinder into the mold cavity while the separating material remains in the cylinder, and removing the separating material from the cylinder and plunger to define the plunger and cylinder free of molding material.

2. The method according to claim 1 in which the molding material is supplied to the cylinder in an amount only slightly greater than the amount required for filling the mold cavity during a molding operation.

3. The method according to claim 2 in which the said second material is paper-like.

4. A method of processing plastic materials from a raw state to a molded product so as to make economical use of the material comprising the steps of: calendering the material to a web of uniform thickness, laminating the calendered material with a foil of predetermined thickness of relatively inexpensive paper-like separating material, cutting out blanks from the laminate with each blank containing a quantity of the plastic material which is slightly greater than the quantity of plastic material in the article to be molded, placing the blanks in a cylinder which communicates with a mold cavity with said foil on the side of the laminate which is remote from the mold cavity, moving a plunger into the cylinder and into engagement with the foil, said foil adapted to be non-adhesive to said plunger and expelling the molding material from the cylinder into the mold cavity in an amount to fill the cavity while leaving the foil and a minor amount of the molding material in the cylinder, withdrawing the plunger from the cylinder, and removing from the cylinder said foil and said minor amount of molding material to define a plunger and cylinder free of molding material prior to another molding operation.

References Cited

UNITED STATES PATENTS

| | | | |
|---|---|---|---|
| 1,899,782 | 2/1933 | Warth | 161—244 |
| 2,094,428 | 9/1937 | Fulton | 161—244 |
| 2,287,277 | 6/1942 | Ryder. | |
| 2,327,079 | 8/1943 | Wacker | 264—328 |

MORRIS SUSSMAN, *Primary Examiner.*